United States Patent [19]

Schoolcraft

[11] Patent Number: 4,464,116
[45] Date of Patent: Aug. 7, 1984

[54] HELICOPTER FLIGHT TRAINING DEVICE

[75] Inventor: Richard J. Schoolcraft, Houston, Tex.

[73] Assignee: Helicopter Training Systems, Inc., Houston, Tex.

[21] Appl. No.: 453,497

[22] Filed: Dec. 27, 1982

[51] Int. Cl.³ .................... G09B 9/08; A63H 27/12
[52] U.S. Cl. .................................... 434/33; 434/32; 244/189; 446/37
[58] Field of Search ............... 434/32, 33; 272/1 C, 272/31 A, 31 B; 46/75, 249; 244/189, 190

[56] References Cited

U.S. PATENT DOCUMENTS

| | | | |
|---|---|---|---|
| 2,711,594 | 6/1955 | Hickey | 434/33 X |
| 2,916,832 | 12/1959 | Hofmann | 434/33 |
| 2,958,141 | 11/1960 | Dorand | 434/33 |
| 3,225,458 | 12/1965 | Glockl | 434/33 |
| 3,548,518 | 12/1970 | McRae | 434/33 X |
| 4,120,099 | 10/1978 | Fett | 434/33 X |
| 4,386,914 | 6/1983 | Dustman | 434/32 |

OTHER PUBLICATIONS

*The World of Model Aircraft*, by Guy R. Williams ©1973, Andre Deutsch in Association with Rainbird Reference Books, pp. 168, 172, 173 and 179, 434-32.

*Primary Examiner*—William H. Grieb
*Attorney, Agent, or Firm*—Richards, Harris & Medlock

[57] ABSTRACT

This invention provides a helicopter flight training device. The device comprises, in combination, a free-flying, radio-controlled, scale model of a helicopter and a flight station that is a substantially actual size simulation of a helicopter cockpit with its associated individual flight controls. The individual flight controls of the flight station incorporate means to convert their operation into a radio signal transmitted to the scale model helicopter to actuate the appropriate flight controls therein to control the flight thereof. In a preferred embodiment of this invention, the flight station consists of dual flight stations with dual flight controls to facilitate teaching student pilots. The device of this invention provides the utmost in safety to the student and instructor during the early, most hazardous, stages of flight training.

5 Claims, 4 Drawing Figures

HELICOPTER FLIGHT TRAINING DEVICE

TECHNICAL FIELD

This invention relates to a helicopter flight training device. More particularly, this invention relates to such a device comprising a free-flying, radio-controlled, scale model of a helicopter, its flight controls being operated by and responsive to radio signals transmitted from a remote flight station or transmitter wherein the transmitted radio signals are responsive to the operation of the individual flight controls in a substantially actual size simulation of a helicopter cockpit.

BACKGROUND OF THE INVENTION

The helicopter is a complex aircraft. It must be kept under constant positive control during flight. The principal flight surfaces are an overhead rotor and a vertical tail rotor. The blades of the overhead rotor are of variable pitch, the pitch being controllable to provide the desired lift, rate of ascent or descent and/or air speed. The blades of the overhead rotor rotate in a generally horizontal plane. However, the angle of the entire overhead rotor blades assembly with respect to its horizontal axis and 360° about its vertical axis is variable and controllable to provide pitch, roll and horizontal flight direction control. Generally, the angle of the overhead rotor assembly with respect to its horizontal axis can be varied from 0° to about 10°.

The tail rotor blades rotate in a generally vertical plane and are also of controllable variable pitch. Controlling the pitch of the tail rotor blades controls the yaw of the aircraft. Actually, horizontal directional control requires an appropriate coordinated control of the angle of the overhead rotor and the pitch of the tail rotor blades.

Normally, a single engine provides the power to rotate the overhead rotor and tail rotors, which operate at a constant speed when in flight. Engine power is controlled by means of a hand operated throttle; in some aircraft, in combination with a governor.

The proper and safe flight of a helicopter requires constant and coordinated attention to the above mentioned controls. This requires that, when in flight, the pilot must operate individual controls by each hand and each foot and in proper coordination with each other. This coordination of control operation is the most difficult and dangerous aspect of learning to fly a helicopter. Accidents or incidents during helicopter pilot training are, unfortunately, undesirably frequent.

This problem has long been recognized in the art and various methods and schemes have been suggested to provide a means of mastering the required coordination of controls under simulated conditions, avoiding the use of actual helicopters for in-flight instruction in the early stages of the learning process. Devices of the prior art include those disclosed in U.S. Pat. No. 2,711,594, U.S. Pat. No. 4,120,099, U.S. Pat. No. 2,916,832, U.S. Pat. No. 3,225,458, and U.S. Pat. No. 2,958,141. From the standpoint of the instant invention, the most pertinent device is that disclosed in U.S. Pat. No. 3,548,518.

That patent discloses the use of an electrically powered and controlled flying model of a helicopter. The flight controls are electrically operated by the operation of a standard set of full size helicopter controls. In this case, the scale model of the helicopter is tethered, severly restricting the comprehensiveness of flight conditions requiring student pilot response. Furthermore, student errors in flight control are intentionally forgiving making it somewhat difficult for the student to recognize and learn from an error. Somewhat subtle problems in flight conditions and control could no unnoticed.

It is an object of this invention to provide an improved helicopter training device. Other objects will become apparent from the description of this invention.

BRIEF STATEMENT OF THE INVENTION

This invention is concerned with a helicopter flight training device comprising, in combination, a free-flying, radio-controlled, scale model of a helicopter and a flight station that is a substantially actual size simulation of a helicopter cockpit with its associated individual flight controls. The individual flight controls of the flight station incorporate means to convert their operation into a radio signal transmitted to the scale model helicopter to actuate the appropriate flight controls therein to control the flight thereof. In a preferred embodiment of this invention, the flight station consists of dual flight stations with dual flight controls to facilitate teaching student pilots.

DESCRIPTION OF A PREFERRED EMBODIMENT

Figure 1:
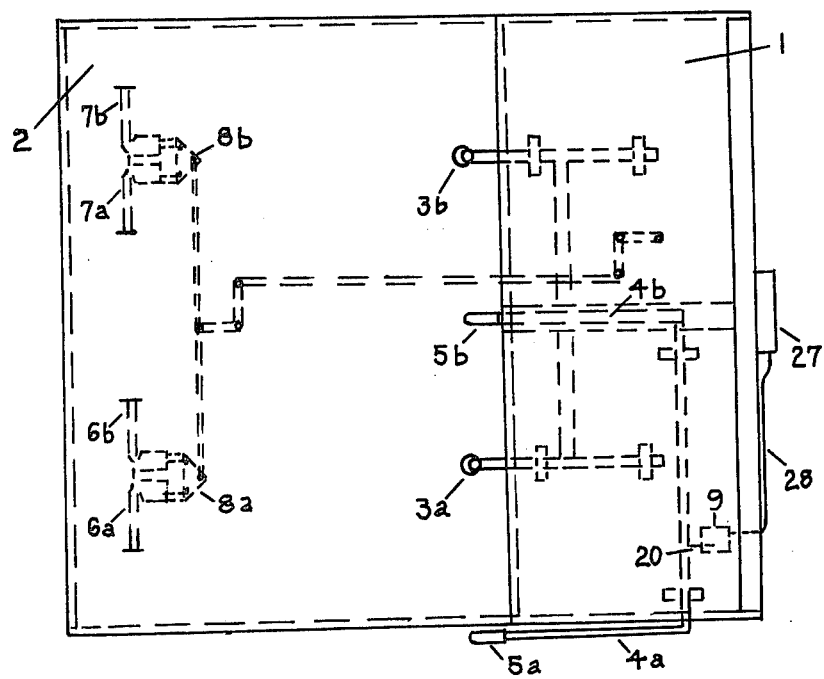
FIG. 1 is a top schematic view of a simulated helicopter cockpit showing the conventional position of the flight controls.
Figure 2:
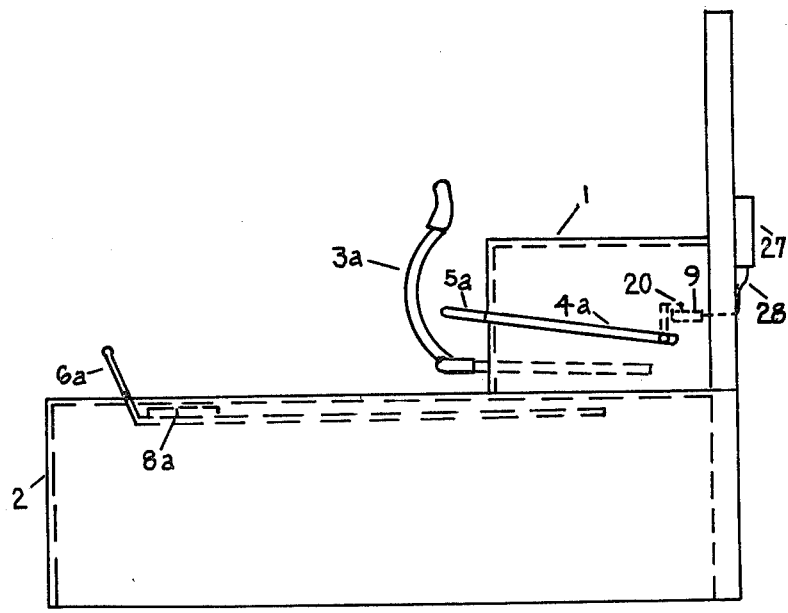
FIG. 2 is a side view of FIG. 1.

Referring to FIGS. 1 and 2, wooden bench 1 with its associated back rest was mounted on platform 2. The bench 1 was of sufficient width to provide seating space for student pilot and instructor. The flight controls were full size flight controls taken from a Bell Jet Ranger helicopter. The cyclic control 3a and 3b was installed just forward of the center of each seat, mounted to provide control movement fore and aft and to the right and left. The cyclic control controls the angle of the overhead rotor assembly with respect to its horizontal axis and 360° about its vertical axis. The collective control 4a and 4b was installed to left of each seat and mounted to move up and down. The collective contol controls the pitch of the overhead rotor blades. Twist grip throttle 5a and 5b was installed on the upper end of the collective control 4a and 4b. Rudder pedals 6a, 6b, 7a and 7b were mounted forward of and on either side of cyclic control 3a and 3b. Each pair of rudder pedals was joined by linkage 8a and 8b which was pivotally center mounted. The rudder pedals control the pitch of the vertical tail rotor blades. The controls associated with each seat were connected to those of the other seat in the conventional manner to permit dual operation facilitating flight instruction.

Figure 3:
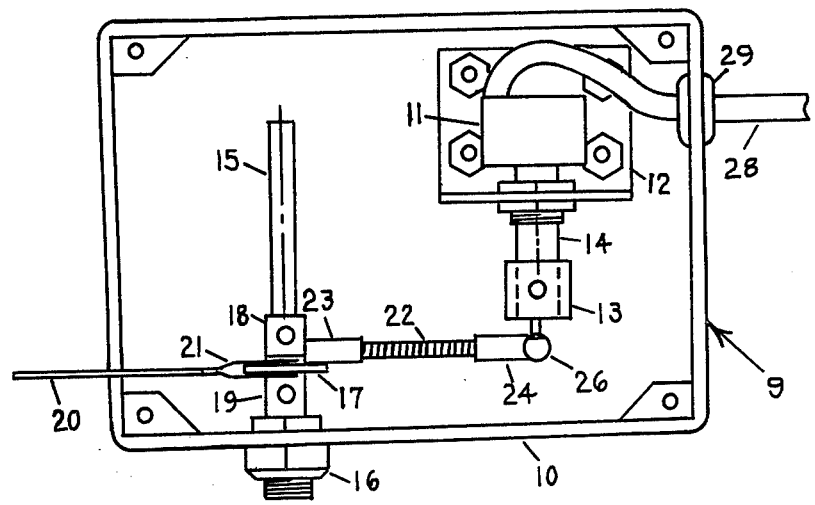
FIG. 3 is a top view of the electro-mechanical interface to convert movement of the flight controls into an appropriate transmitted radio signal.
Figure 4:
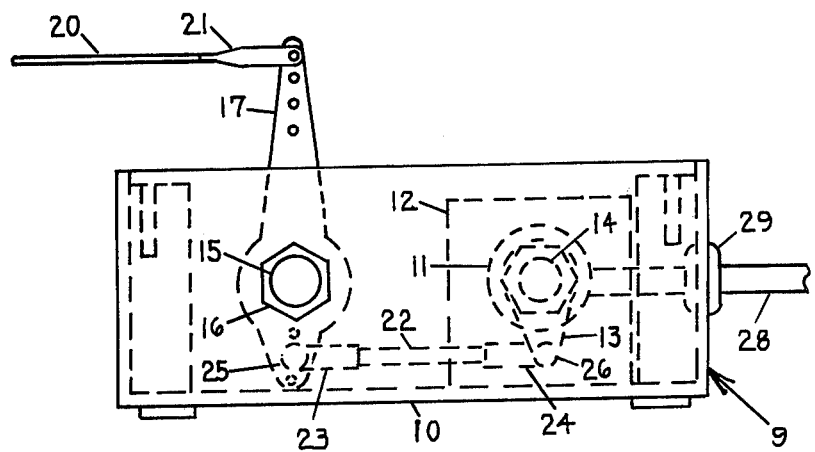
FIG. 4 is a side view of FIG. 3.

Movement of each of the flight controls was transmitted by means of threaded control rods to an electro-mechanical interface shown in FIGS. 3 and 4 and installed under the floor of platform 2 or under the seat of bench 1. While only one electro-mechanical interface 9 is shown in FIG. 2, five were employed—one each for the rudder pedals assembly, collective control and throttle control and two for the cyclic control, one being responsive to fore and aft movement of the cyclic control, the other being responsive to right and left movement of the cyclic control.

Electro-mechanical interface 9 consisted of a plastic box 10 measuring approximately 10 cm.×7.5 cm.×4 cm. deep. The metal cover (not shown) was held in place by corner screws (not shown). Potentiometer 11 was attached to the base at one end of the box 10 by means of bracket 12. Lever 13 was rigidly attached to the rotating arm 14 of the potentiometer. Disposed in the opposite end of box 10 was circular rod 15 held in place by nut 16. Lever 17 was positioned on rod 15 by means of retainers 18 and 19. Threaded control rod 20 from the flight control was attached to lever 17 by means of fitting 21. Levers 13 and 17 were connected by means of threaded rod 22, plastic fittings 23 and 24 engaging ball joints 25 and 26. Output of the potentiometer was fed to the radio transmitter 27 by means of cable 28 passing from the potentiometer through grommet 29 in the side of box 10. The above described assembly permitted precise adjustment of the relationship between the lateral movement of the threaded control and the rotating arm of the potentiometer.

The flying scale model helicopter employed was a Ball Jet Ranger manufactured by and commercially available from Kavan, Nurnberg, West Germany. The model had a fuselage length of 145 cm., an overhead rotor diameter of 160 cm. and a flight weight of 4.5 kg. The helicopter was powered by a Webra Speed of 0.61 Schnuerle-ported glow fuel engine.

Radio control equipment employed was that manufactured by and available from Kraft Systems, Inc. of Vista, California under the name Series Seventy-Five, KP-7B System. The transmitter and receiver provided seven channels of transmission and reception on the 72 MHz frequencies. Five servo motors supplied with the KP-7B System were employed in the helicopter to operate the flight controls. The potentiometer for each transmission channel was removed from a transmitter of the KP-7B System and installed in the appropriate electro-mechanical interface box previously described. Both the transmitter and receiver were powered by associated battery packs.

The flight station of the novel helicopter training device of this invention can be varied substantially. For example, in another construction of the instant device, the flight station consisted of the completely enclosed, climate controlled, cockpit with associated flight controls of the Rotor Way Exec helicopter, manufactured by Rotor Way Aircraft Inc., Tempe, Ariz. This provided the total feel and environment of a helicopter cockpit. The cockpit was mounted on a flat bed trailer providing mobility to training areas. In addition, the cockpit was mounted on a motorized turntable, the rotation being activated by the pilot with a simple switch on the collective control lever. This permitted the pilot to view the flight of the model helicopter in any direction.

The radio controlled, free flying, scale model helicopter employed in this invention is not limited to any particular type. In addition to the Kavan described herein, the Horizon 60, commercially available from Horizon Model Crafts, Houston, Tex., has also been employed. It is required that all flight controls be capable of precise adjustment responsive to transmitted radio signals. Control features, in addition to those described herein, may also be employed. For example, one helicopter model used in the practice of this invention was equipped with a governor to maintain the rotors at a constant speed and a radio activated electric starter. Radio controlled, free flying, scale model helicopters are well known and readily commercially available in the market place, either fully assembled or in kit form. Similarly known and available, is all the necessary radio control equipment with comprehensive instructions for its installation and use.

The novel helicopter training device of this invention is particularly useful in the early stages of flight training when coordination of the operation of flight controls must be mastered. It has been found that the use of the instant device can reduce by as much as twenty hours dual flight instruction time in a full size helicopter. With the model being untethered, flight control under practically all flight conditions, including autorotative landings, can be learned. Remaining for learning in a full size helicopter would be the sense of rate of closure on landing and the so-called "seat of the pants" feel in actual flight.

As previously mentioned, the training device of this invention provides the utmost in safety to the student and instructor during the early, most hazardous, stages of flight training. With radio controlled helicopter models presently costing in the order of one thousand dollars and full size helicopters costing many tens of thousands of dollars, the economic advantages of this device, vis-a-vis aircraft damage due to accidents, is no insignificant factor. One or more helicopter models in reserve is economically feasible, permitting uninterrupted flight training. With further regard to safety of the student and instructor, the overhead rotor of the scale model helicopters employed develop several thousand kilograms of centrifugal force. A blade failure under such conditions could send it flying with potentially seriously harmful results. This device permits a safe separation between the helicopter and flight station.

What is claimed is:

1. A helicopter pilot trainer comprising, in combination, (1) a free-flying, scale model of a helicopter having its flight controls operated and controlled by means responsive to radio signals transmitted from a remote flight station to a radio receiver in said helicopter, and (2) a flight station comprising a substantially actual size simulation of a helicopter cockpit with its associated individual flight controls, and means responsive to the operation of the flight controls at the flight station for converting said operation into a radio signal transmitted to the radio receiver in said scale model helicopter to effect an operation of the flight controls in the scale model helicopter corresponding to the operation of the controls at the flight station, said means responsive to the operation of the flight controls at the flight station comprising an electro-mechanical interface associated with each flight control and physically separated from said radio transmitter, the electro-mechanical interface providing an adjustable mechanical linkage between the particular individual flight control and a potentiometer in said electro-mechanical interface to vary the output of the potentiometer in response to the operation of the individual flight control, with the output of the potentiometer being fed to the radio transmitter to transmit the controlling radio signal to the radio receiver.

2. A helicopter pilot trainer comprising, in combination, (1) a scale model of a helicopter having a rotatable variable pitch overhead rotor, a rotatable variable pitch tail rotor and motor means to rotate said rotors, a radio receiver in said helicopter, means to control the operation of said rotors and motor responsive to a radio signal received by said radio receiver, said helicopter being capable of free flight; and (2) a flight control station comprising a substantially actual size simulation of a helicopter cockpit with its associated controls for controlling the overhead rotor, tail rotor and motor means to rotate said rotors, a radio transmitter in said flight control station, and means to convert operation of said associated controls into a radio signal transmitted by said transmitter to the radio receiver in said helicopter to actuate the controls in said helicopter responsive to the operation of the controls at said flight control station, said means to convert operation of said associated controls into a radio signal comprising, an electro-mechanical interface associated with each flight control and physically separated from said radio transmitter, the electro-mechanical interface providing an adjustable mechanical linkage between the particular individual flight control and a potentiometer in said electro-mechanical interface to vary the output of the potentiometer in response to the operation of the individual flight control, with the output of the potentiometer being fed to the radio transmitter to transmit the controlling radio signal to the radio receiver.

3. A helicopter pilot trainer comprising, in combination, a scale model of a helicopter capable of free flight and a flight station from which the flight of the helicopter is controlled; said helicopter having an overhead rotor assembly having rotatable, variable pitch, substantially horizontal blades, the angle of the overhead rotor assembly with respect to its horizontal axis and 360° about its vertical axis capable of being varied and controlled, a tail rotor having rotatable, variable pitch, substantially vertical blades; motor means to rotate said rotors; control means to separately control each of said motor, angle of overhead rotor assembly, pitch of overhead rotor blades and pitch of tail rotor blades; a radio receiver in said helicopter; said control means being individually actuated by and responsive to radio signals received by said radio receiver; said flight station comprising a substantially actual size simulation of a helicopter cockpit with its associated individual controls for controlling individually the angle of the overhead rotor, pitch of overhead rotor blades, pitch of tail rotor blades and motor means; said associated controls being of the size, position and movement as in an actual size helicopter; a radio transmitter in said flight station; means to convert operation of each of said associated individual controls into a radio signal to actuate and operate the corresponding control in said helicopter responsive to the operation of the controls at said flight station, said means to convert operation of each associated individual controls into a radio signal comprising an electro-mechanical interface associated with each flight control and physically separated from said radio transmitter, the electro-mechanical interface providing an adjustable mechanical linkage between the particular individual flight control and a potentiometer in said electro-mechanical interface to vary the output of the potentiometer in response to the operation of the individual flight control, with the output of the potentiometer being fed to the radio transmitter to transmit the controlling radio signal to the radio receiver.

4. An improved flight station to transmit radio signals to a radio receiver located in and adapted to control the flight of a free-flying scale model of a helicopter in response to said transmitted signals comprising a substantially actual size simulation of a helicopter cockpit with its associated flight controls, a radio transmitter in said flight station, means for converting operation of the flight controls into a radio signal transmitted by said transmitter to the radio receiver in the helicopter model to operate the flight controls in said helicopter model responsive to the operation of the flight controls at the flight station, said means for converting operation of the flight controls into a radio signal comprising an electro-mechanical interface associated with each flight control and physically separated from said radio transmitter, the electro-mechanical interface providing an adjustable mechanical linkage between the particular individual flight control and a potentiometer in said electro-mechanical interface to vary the output of the potentiometer in response to the operation of the individual flight control, with the output of the potentiometer being fed to the radio transmitter to transmit the controlling radio signal to the radio receiver.

5. The flight station of claim 4 wherein the actual size simulation of a helicopter cockpit includes dual stations with dual flight controls facilitating teaching student pilots.

* * * * *

UNITED STATES PATENT AND TRADEMARK OFFICE
CERTIFICATE OF CORRECTION

PATENT NO. : 4,464,116

DATED : August 7, 1984

INVENTOR(S) : Richard J. Schoolcraft

It is certified that error appears in the above-identified patent and that said Letters Patent is hereby corrected as shown below:

Column 2, line 4, change "no" to --go--.

Column 3, line 26, change "Ball" to --Bell--.

Column 3, line 30, change "Webra Speed of 0.61 to --Webra Speed .61--.

Signed and Sealed this

Twelfth Day of November 1985

[SEAL]

Attest:

DONALD J. QUIGG

Attesting Officer

Commissioner of Patents and Trademarks